United States Patent
Chang et al.

(10) Patent No.: US 11,455,090 B2
(45) Date of Patent: Sep. 27, 2022

(54) SYSTEM AND METHOD FOR DETECTING AND RESIZING A WINDOW FOR IMPROVED CONTENT DELIVERY

(71) Applicant: Digits Financial, Inc., San Francisco, CA (US)

(72) Inventors: Wayne Chang, North Andover, MA (US); Jeffrey Hall Seibert, Jr., San Mateo, CA (US)

(73) Assignee: Digits Financial, Inc., San Francisco, CA (US)

(*) Notice: Subject to any disclaimer, the term of this patent is extended or adjusted under 35 U.S.C. 154(b) by 0 days.

(21) Appl. No.: 16/875,563

(22) Filed: May 15, 2020

(65) Prior Publication Data
US 2021/0357109 A1    Nov. 18, 2021

(51) Int. Cl.
*G06F 3/048*     (2013.01)
*G06F 3/04845*   (2022.01)
*G06F 3/0481*    (2022.01)
*G06F 3/14*      (2006.01)
*G06F 3/16*      (2006.01)

(52) U.S. Cl.
CPC ........ *G06F 3/04845* (2013.01); *G06F 3/0481* (2013.01); *G06F 3/14* (2013.01); *G06F 3/167* (2013.01)

(58) Field of Classification Search
CPC ....... G06F 3/04845; G06F 3/0481; G06F 3/14
See application file for complete search history.

(56) References Cited

U.S. PATENT DOCUMENTS

| | | | |
|---|---|---|---|
| 6,317,142 B1* | 11/2001 | Decoste ................. | G06F 9/451 715/762 |
| 9,093,050 B1* | 7/2015 | Orlov ....................... | G09G 5/39 |
| 10,101,891 B1* | 10/2018 | Kulewski ............ | G06F 3/04845 |
| 2012/0200776 A1* | 8/2012 | Tanaka ............... | H04N 21/4334 348/564 |
| 2013/0104220 A1* | 4/2013 | Lee ........................ | G06F 21/34 726/9 |
| 2014/0137005 A1* | 5/2014 | Park .................... | G06F 9/44526 715/760 |
| 2014/0266978 A1* | 9/2014 | Ishigami .................. | G09G 5/14 345/1.1 |
| 2015/0254222 A1* | 9/2015 | Shadfar ................. | G06F 40/169 715/230 |
| 2016/0124618 A1* | 5/2016 | Bostick ................ | G06F 3/0481 715/790 |

(Continued)

OTHER PUBLICATIONS

Mosiac—issue resizing app warning notification (2017).*

(Continued)

*Primary Examiner* — David E Choi
(74) *Attorney, Agent, or Firm* — Cesari and McKenna, LLP

(57) ABSTRACT

A system and method for ensuring application content is displayed in a proper sized display is provided. An illustrative web-based application detects the display characteristics, e.g., size and/or aspect ratio, of its display window. If the display characteristics do not match a predefined requirement, the application ceases updating content and displays resizing notifications to alert the user to adjust the window. Once the window's display characteristics match the predefined criteria, the application resumes updating content in the window.

17 Claims, 10 Drawing Sheets

(56) References Cited

U.S. PATENT DOCUMENTS

2016/0240009 A1* 8/2016 Lyren ................... H04N 7/157
2016/0266736 A1* 9/2016 Kirsch ................. G06F 3/0482
2017/0075728 A1* 3/2017 Cropper ............... G06F 9/4881
2018/0024647 A1* 1/2018 Coletrane-Pagan .... G06F 3/038
                                                                              345/158

OTHER PUBLICATIONS

Anonymous, "javascript—Detect viewport orientation, if orientation is Portrait display alert message advising user of instructions—Stack Overflow", Mar. 17, 2020, Retrieved from the Internet: URL:http://web.archive/org/web/20200317003542/https://stackoverflow.com/questions/4917664/detect-viewport-orientation-if-orientation-is-portrait-display-alert-message-ad [retreived on Aug. 9, 2021] pp. 1, 2, 4, 8.
International Search Report dated Aug. 19, 2021 for International Application No. PCT/US2021/032028 filed May 12, 2021 for Digits Financial, Inc., 12 pages.

* cited by examiner

SYSTEM AND METHOD FOR DETECTING AND RESIZING A WINDOW FOR IMPROVED CONTENT DELIVERY

BACKGROUND

Technical Field

The present invention is directed to graphical user interfaces (GUIs), and more particularly to properly sizing a GUI window for improved content delivery.

Background Information

Web-based applications are often utilized to implement software-as-a-service (SaaS). Application software may execute on a server and display content in a web browser executing on a client computer, mobile device, etc. Exemplary content may include, for example, video, animations, text, graphical charts, etc. that are arranged in a particular manner by the application. The application may arrange the various content features in a manner that requires a particular window size and/or aspect ratio to achieve a desired user experience. However, users often resize windows within a graphical user interface (GUI). Such window resizing may occur due to, e.g., the need to have a plurality of windows open at once, limitations on a display size, swapping between windows, etc. Should a user resize the browser window in which a particular web application is displaying content so that the window has a set of display characteristics (e.g., size and/or aspect ratio) that differ from the desired display characteristics, the user experience of the user may be reduced. This reduction in the user experience may occur as the application was optimized to display content in a window having particular display characteristics.

Methods exist for an application to identify the size of the window in which it is displaying content. Certain applications may change the way content is displayed in windows whose display characteristics do not match what is desired. Alternatively, portions of the content may not be visible to a user, there by degrading the user experience of utilizing the application. In either of these scenarios, the user is not experiencing the content in the manner in which the application developer originally desired.

SUMMARY

The disadvantages of the prior art are overcome by providing a system and method for detecting and resizing a graphical user interface (GUI) window to improve an application's delivery of content. In an illustrative embodiment, a web-based application, portions of which may be executing by a processor of a client, detects display characteristics, such as the size and/or aspect ratio, associated with the browser window. This detection may be performed using conventional system calls. If the display characteristics of the browser window do not match a predetermined set of display characteristics criteria for the application, the application illustratively halts the update of the content in the window. Illustratively, the content currently displayed in the window may be dimmed or otherwise de-highlighted. The application may continue to execute and perform various functionality; however, content illustratively is not updated for display the user. This temporary halt in updates prevents the user from missing out on content being displayed in the manner in which the application is programmed to display it. In alternative embodiments, the updates may continue and not be halted. In such alternative embodiments, a resizing notification may be scaled or positioned to not cover the updating content.

A resizing notification is displayed in the window to alert the user to the need to resize the window. The resizing notification may include one or more features. One exemplary feature is a text and/or graphical notification informing the user that the window needs to be resized. These notifications may specify, e.g., the size and/or desired aspect ratio for the window. Another exemplary feature is displaying graphics of arrows, or other graphical indicators, in the corners, or alongside one or more edges of the window, to alert the user of which dimension(s) of the window that need to be increased.

In illustrative embodiments, the resizing notifications may further include animations, the playback of video, sound alerts, etc. The resizing notifications are displayed until the window is resized to meet the desired display characteristics. In alternative embodiments, the resizing notifications are displayed for a predetermined length of time. If the window is not resized before the predetermined length of time elapses, the resizing notifications are halted and content update resumes.

In a further illustrative embodiment, an application or software executing in a web browser on a portable device detects the orientation (e.g., landscape or portrait) in which the device is currently oriented. If the current orientation does not match a preferred orientation, the application halts its updates of the display of content and displays a set of orientation notifications. Similarly, in the illustrative embodiment of an application displaying content in a web browser, the current content may be dimmed or otherwise de-highlighted. The orientation notifications illustratively comprise a set of rotational arrow graphics located in the corners of the window to provide a visual indicator to alert the user to rotate the mobile device into the desired orientation.

Advantageously, the one or more embodiments described herein provide an improvement in operation of GUIs by detecting and sizing a GUI window for improved content delivery. Using the one characteristics of a browser window together with a predetermined set of display characteristics criteria for the application to determine the resizing of the GUI window, the one or more embodiments described herein may ensure that content is displayed to, for example, the user in the manner in which the application is/was programmed to display the content such that content of interest is not missed.

BRIEF DESCRIPTION OF THE DRAWINGS

The above and further advantages of the present invention may be better understood in relation to the accompanying figures, in which like reference numerals indicate identical or substantially identical elements, of which.

DETAILED DESCRIPTION OF AN
ILLUSTRATIVE EMBODIMENT

Figure 1:
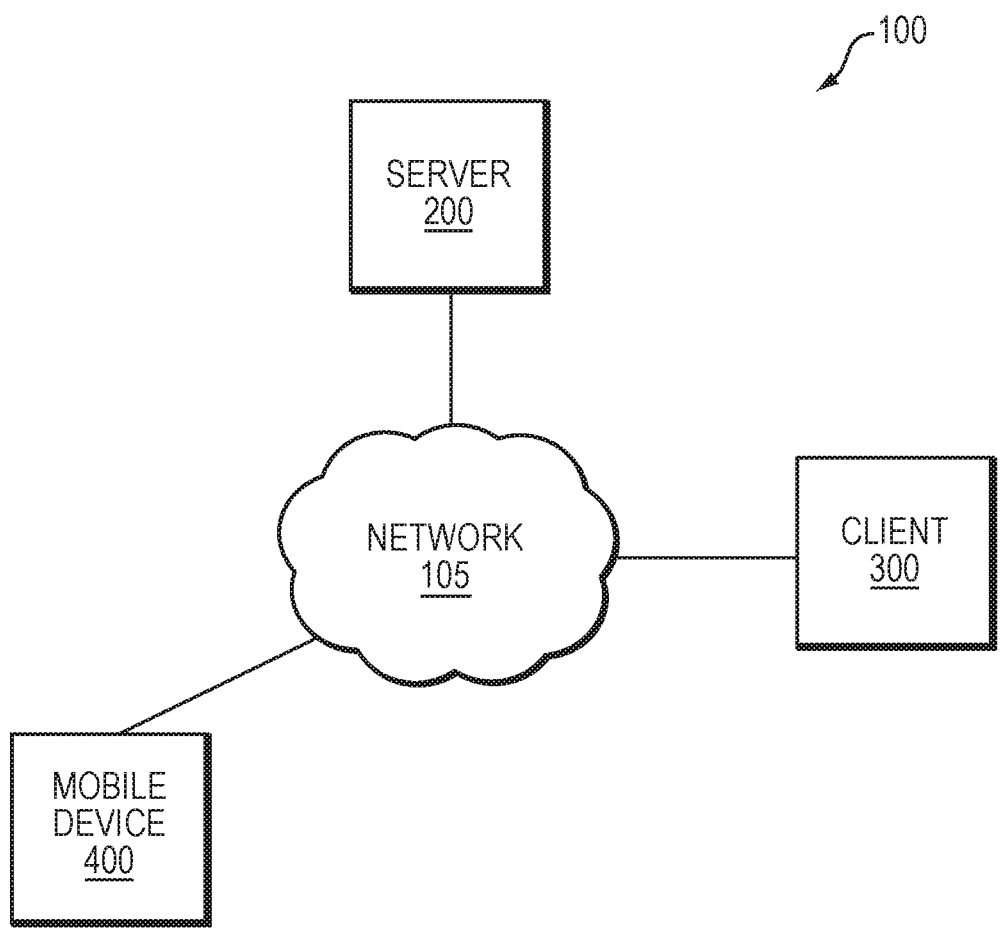
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more servers 200, clients 300, and/or mobile devices 400. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc. Thus, for example, in an illustrative embodiment, a mobile device 400 may communicate using a cellular telephone network to transmit data. The exemplary cellular telephone network may then be interconnected with the Internet, which is further connected to a LAN, which ultimately is operatively connected to server 200.

Exemplary servers 200, described below in reference to FIG. 2, may execute an application that displays content on client 300 or mobile device 400. Illustratively, the content may be displayed in a web browser executing on client 300 or mobile device 400. Client computer 300, described further below in reference to FIG. 3, may comprise a user's computer that executes an application in accordance with an illustrative embodiment of the present invention. In alternative embodiments of the present invention, client computer 300 may communicate in a client-server relationship with server 200 to access an application executing on the server. In other alternative embodiments of the present invention, client computer 300 may execute a web browser that accesses server 200 to display information relating to an application.

Figure 4:
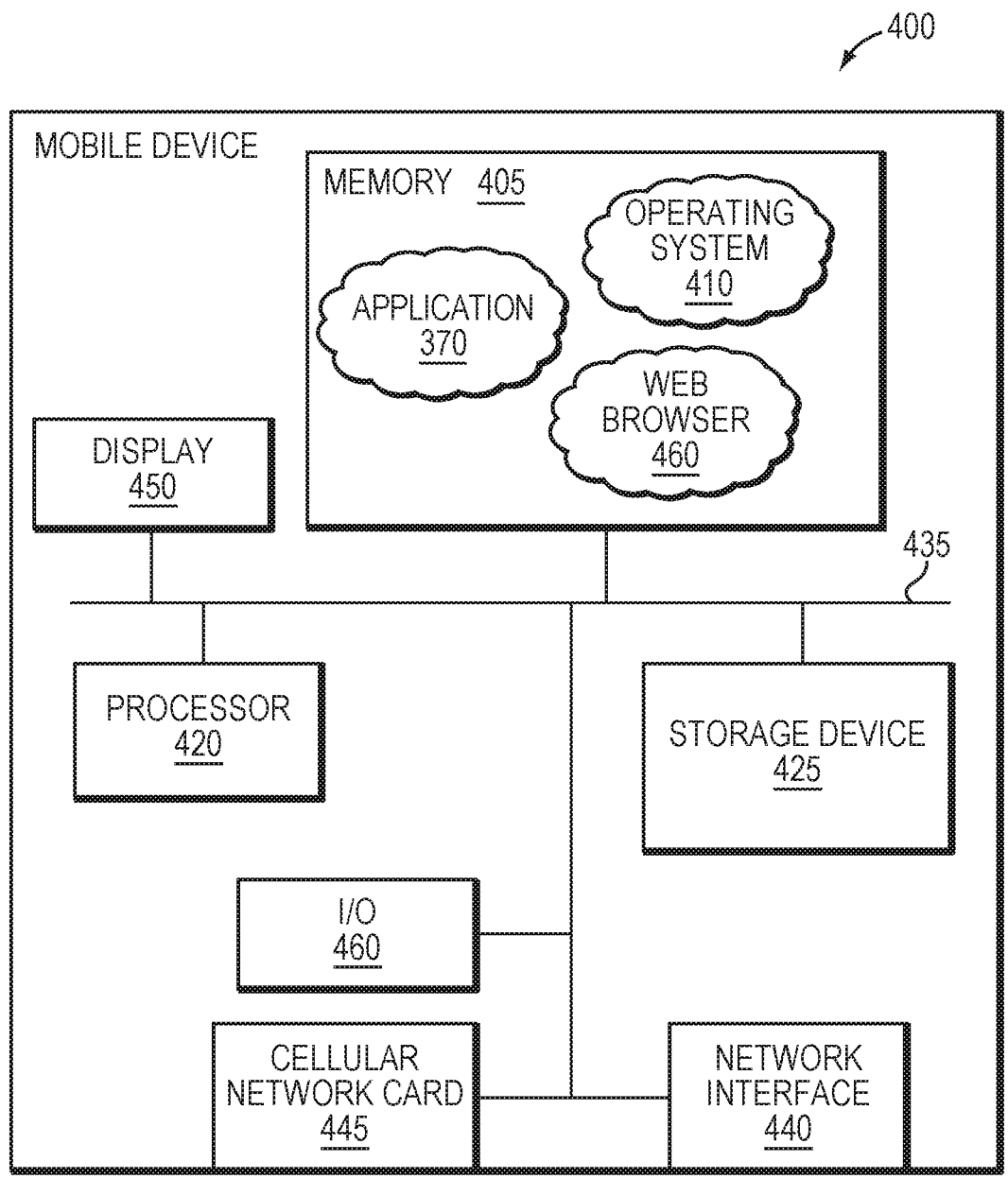
FIG. 4 is a schematic block diagram of an exemplary mobile device in accordance with an illustrative embodiment of the present invention.

Mobile device 400, described further below in reference to FIG. 4, is also illustratively operatively connected to network 105. Illustratively, mobile device 400 may comprise a smart phone, a personal digital assistant and/or a tablet computer. More generally, mobile device 400 may comprise any movable device capable of executing applications and/or accessing the worldwide web (WWW) via, e.g., a web browser.

Further, it should be noted that while a single server 200, client 300, and mobile device 400 are described and illustrated, in alternative embodiments of the present invention, a plurality of such network entities may be utilized. Therefore, the description and illustration of a single server 200, client 300, and/or mobile device 400 should be taken as exemplary only.

Figure 2:
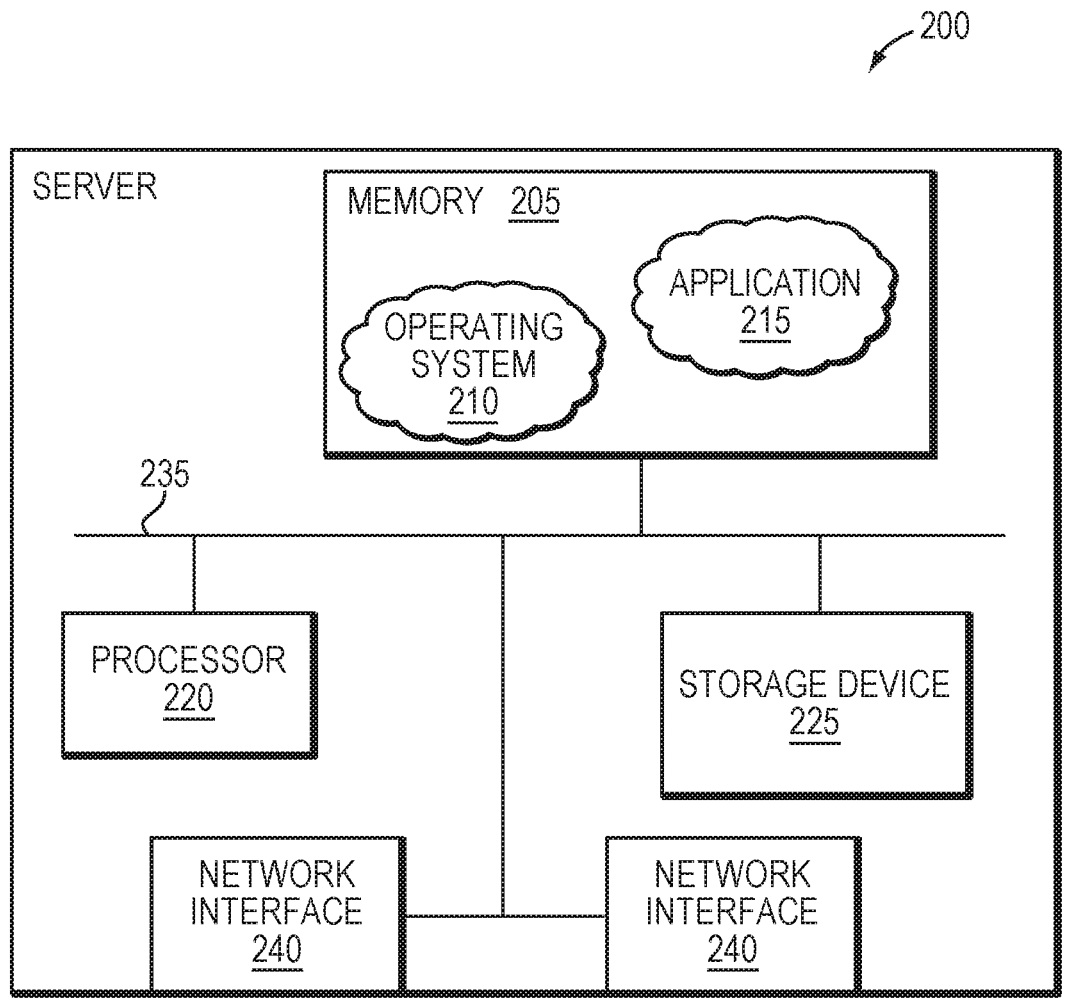
FIG. 2 is a schematic block diagram of an exemplary server system in accordance with an illustrative embodiment of the present invention.

FIG. 2 is a schematic block diagram of an exemplary server 200 in accordance with an illustrative embodiment of the present invention. The server 200 may illustratively comprise of one or more network interfaces 240, one or more processors 220, one or more storage devices 225, and a memory 205 operatively interconnected by a system bus 235.

The network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

The memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server. An application 215, portions of which may be resident in memory 205, is executed by the processor to implement various functionality, such as a financial accounting system, etc. The descriptions and illustrations contained herein are directed towards an exemplary application 215 that implements a financial accounting system. However, it should be noted that it is expressly contemplated that the application 215 may implement other types of systems. Therefore, the description of a financial accounting system application 215 should be taken as exemplary only.

In accordance with an illustrative embodiment of the present invention, the application processes various data in accordance with user commands and, in part, displays graphical content. Examples of displayed content are discussed further below, but generally content may comprise text, video, charts, animations, graphs, etc. arranged in a particular manner defined by the application. In an illustrative embodiment, such content is displayed in a graphical user interface (GUI) window such as in a web browser window on a user computer 300 and/or mobile device 400.

In alternative embodiments, the content may be displayed in a window of an application executing on computer 300 and/or mobile device 400.

It should be noted that in an illustrative embodiment of the present invention, the application 215 may be configured to operate in a client/server manner in which the application 215 executes on the server, but displays content on a client 300 and/or mobile device 400. In alternative embodiments of the present invention, the application 215 may interact with a web server (not shown) executing on server 200 to provide content via a web browser that may be executed on, e.g., client 300 or mobile device 400. Illustratively, portions of the application 215 may be loaded into the web browser and executed by the processor of the client/mobile device. This may be accomplished by, e.g., loading JavaScript code into the browser.

While the use of JavaScript is described herein, it is expressly contemplated that other techniques may be utilized to execute portions of application 215 on client 300 and/or mobile device 400. Examples include, e.g., the use of CSS media queries. Further, in a mobile application embodiment, the use of exemplary languages such as Swift, Java, and/or Kotlin may be utilized. However, as will be appreciated by those skilled in the art, the principles of the present invention may be implemented using any programming language. Therefore, the description of the use of JavaScript should be taken as exemplary only.

The storage device 225, which may be internal and/or external to the server 200, stores data associated with the operating system 210 and application 215. In alternative embodiments, storage device 225 may comprise a plurality of devices, which may be internal and/or external to server 200. Storage device 225 may comprise a cloud-based storage, RAID array, etc. in accordance with alternative embodiments of the present invention.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
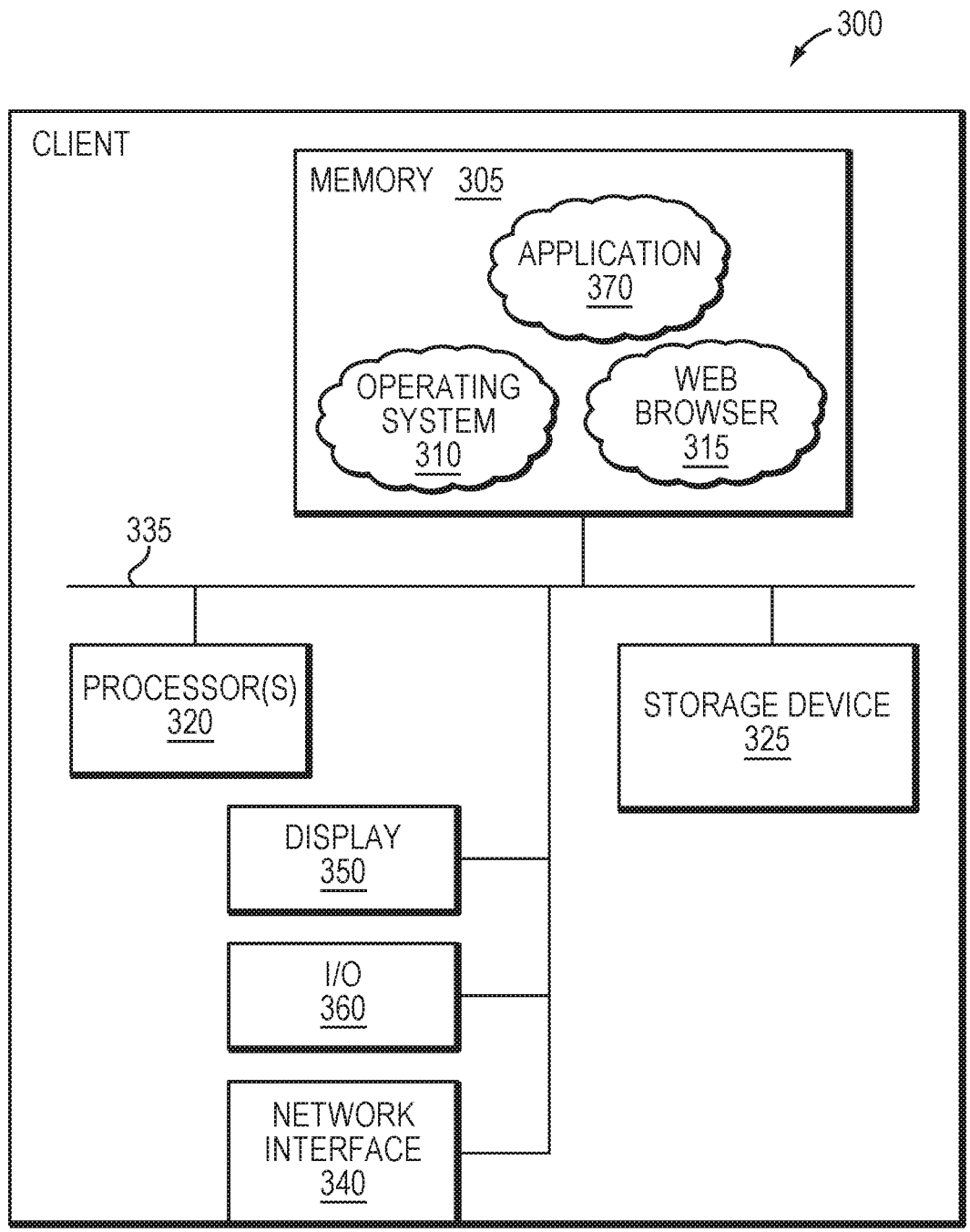
FIG. 3 is a schematic block diagram of an exemplary client computer system in accordance with an illustrative embodiment of the present invention.

FIG. 3 is a schematic block diagram of an exemplary client computer system 300 in accordance with an illustrative embodiment of the present invention. The client computer system 300, illustratively comprises a memory 305, one or more processors 320, one or more storage devices 325, a network interface 340, a display 350, and one or more forms of input/output (I/O) 360 that all operatively interconnected by a system bus 335. Memory 305, processors 320, storage device 325, and network interface 340 illustratively perform similar functions as described above in relation to server 200.

The display 350 may illustratively comprise a conventional computer monitor or other visual display as are known to those skilled in the art. The (I/O) system 360 may comprise, for example, a keyboard, mouse, light pen, touchscreen and/or other forms of inputting data and manipulating GUI elements in accordance with various embodiments of the present invention. In one illustrative embodiment, the (I/O) may comprise a keyboard and mouse that may be utilized to enter data and to rearrange and/or resize GUI windows.

A web browser 315 enables a user of the client computer system 302 to access a webpage provided by application 215. Illustratively, the web browser 315 accesses a webpage provided by application 215 via web server (not shown) executing on server 200. In accordance with an illustrative embodiment of the present invention, the web browser 315 implements the well-known JavaScript. Illustratively, the application 215 may be configured to load JavaScript code into web browser 315 to be executed in the client's JavaScript environment. It should be noted that while JavaScript is described herein, as noted above, in alternative embodiments, other software environments may be utilized to implement portions of the present invention.

In alternative embodiments, a local version of the application 370 may be stored in memory 305 and executed by processor 320. Application 370 may communicate with application 215 in a client-server relationship. In such embodiments, the application may display content in an application window and not a browser window. Certain operations, e.g., detection of window size, etc., may then be performed using operating system 310 function calls instead of browser 315 and/or JavaScript (or other web based environment) function calls.

FIG. 4 is a schematic block diagram of an exemplary mobile device 400 in accordance with an illustrative embodiment of the present invention. As noted above, mobile device 400 may comprise any device capable of executing applications and/or accessing the World Wide Web. Illustratively, mobile device 400 may comprise a smart phone, a personal digital assistant and/or a tablet computer. The mobile device 400 illustratively comprises network interfaces 440, one or more processors 420, a memory 405, a storage device 425, and a cellular network card 445 interconnected by a system bus 435.

Memory 405, processor 420, storage device, (I/O) 460, and network interface 440 function similar to those components described above. Display 450 may comprise an illustrative touchscreen that is used for both display and input purposes. Cellular network card 445 may implement the circuitry to enable the mobile device to access one or more cellular networks to enable, e.g., data transmission and reception.

In mobile device 400, the memory 405 may store an operating system 410 that is executed by the processor 420. An application 370 and/or web browser 460 may also be stored in memory in illustrative embodiments of the present invention. Illustratively, the application 370 may interact with application 215 executing on the server 200 in accordance with an illustrative embodiment of the present invention. Web browser 460 may be utilized by a user of the mobile device 400 to access the application 215 via the World Wide Web. In accordance with illustrative embodiments of the present invention, portions of the application 215 may be loaded into memory 405 and executed as part of the web browser 460, e.g., using JavaScript.

Figure 5:
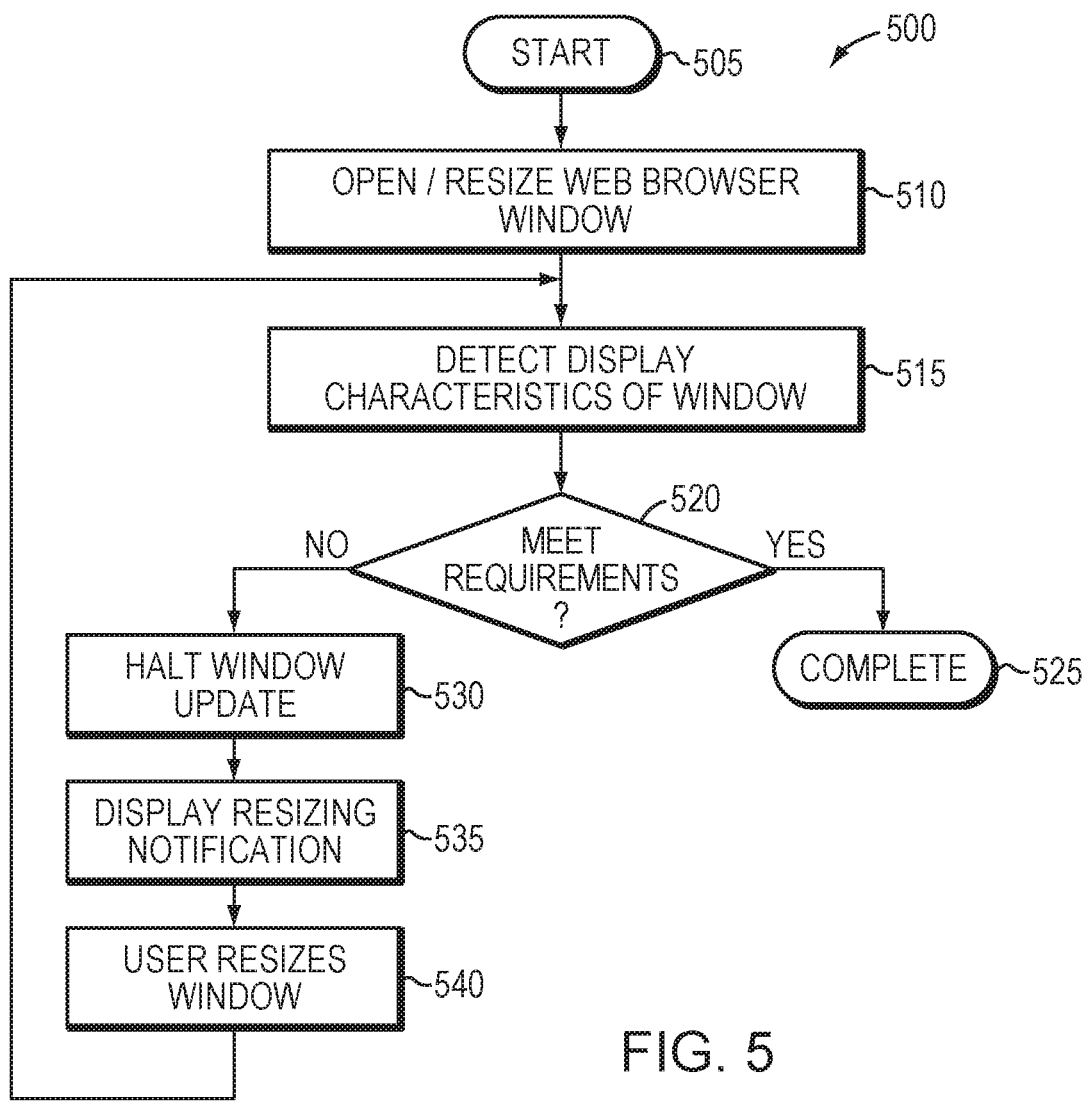
FIG. 5 is a flowchart detailing the steps of a procedure for detecting and resizing a window in accordance with an illustrative embodiment of the present invention.

FIG. 5 is a flowchart detailing the steps of a procedure 500 for detecting a window size and resizing it to improve content delivery in accordance with an illustrative embodiment of the present invention. The procedure 500 begins in step 505 and continues to step 510 where a web browser window is either opened initially and/or resized. Illustratively, a user may resize a window, typically by selecting one of the edges of the window and dragging the edge. In alternative embodiments, window may be enlarged to a one of a number of predefined sizes by clicking on an icon contained within a header bar of the window. For example, one predefined size may be a full screen size while a second predefined size may be a system default size.

Figure 6:
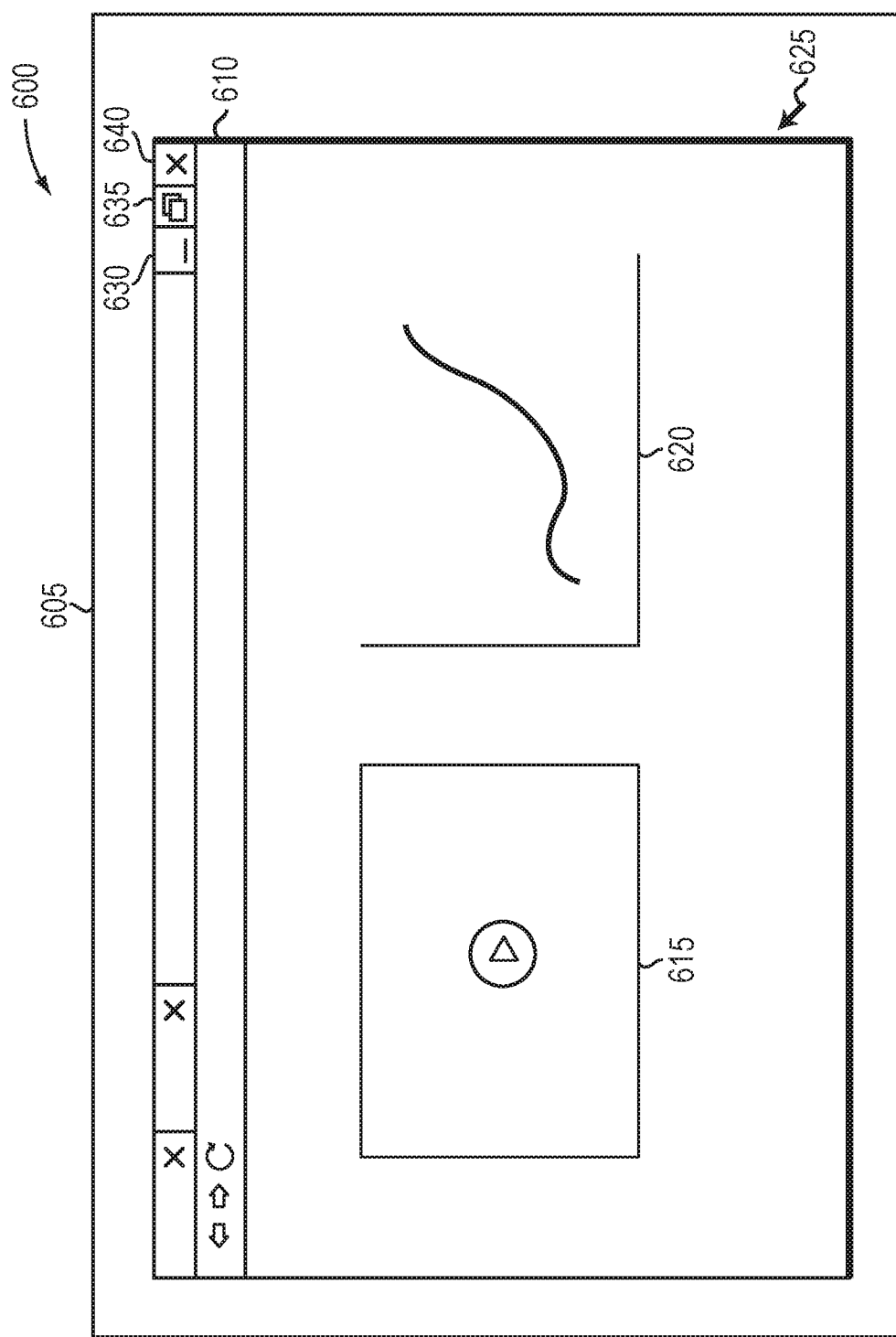
FIG. 6 is a view of an exemplary GUI window illustrating a preferred application content display in accordance with an illustrative embodiment of the present invention.

FIG. 6 is a view 600 of an exemplary computer screen 605 illustrating an exemplary window 610 in accordance with an illustrative embodiment of the present invention. Exemplary view 600 includes a display screen 605 having at least one exemplary web browser window 610 contained therein. Illustratively, the browser window 610 includes various content including, for example, video content 615, and graph content 620. It should be noted that in accordance with alternative embodiments of the present invention, the various types of content may differ in may include such things as text, graphics, movable graphics animations, etc. Therefore, the description of exemplary video 615 and graph 620 should be taken as exemplary only. The operating system illustratively provides a cursor 625 that may be utilized by the user to resize window 610. In accordance with an illustrative embodiment of the present invention, the application is configured to display the various content 615, 620 in a certain manner and, more specifically, in a window 610 having a predefined set of display characteristics.

In response to the resizing event, the window's display characteristics are detected in step 515. Illustratively, detection of the windows display characteristics may be performed using conventional software techniques. In an illustrative embodiment, JavaScript code executing the browser of the client computer detects the resizing of the window. One example of this may be accomplished is:

```
window.addEventListener('resize', function(event) {
 if (window.innerHeight < MIN_DESIRED_HEIGHT ||
 window.innerWidth < MIN_DESIRED_WIDTH) {
 //Display Resizing Notifications
 } else{
 // Continue Normal Operation
 }
}}
```

As will be appreciated by those skilled in the art, other coding techniques may be utilized to implement the principles of the present invention. Therefore, the description of JavaScript, or any particular code, should be taken as exemplary only.

A determination is made in step 520 whether the detected display characteristics of the window meet a predefined set of requirements. Illustratively, the predefined set of requirements may be assigned by the application and may include, for example, a minimum width, minimum height, and/or a particular aspect ratio. As noted above, the predefined requirements may be set by the application to ensure that the user experience is as desired by the application developer. Generally, the predefined display requirements are set so that the content is displayed in a manner to improve the user experience. While it is possible to shrink the size of display elements based on the overall window size, the richness of content may be lost when shown. The application may desire specific display requirements to ensure that the content meets with predefined criteria.

Should the detected display characteristics of the window meet the predefined requirements, the procedure branches to step 525 and completes.

However, if in step 520 it is determined that the detected display characteristics do not meet the predefined requirements, the procedure branches to step 530 where the application halts window updates. Illustratively, the holding the display window updates may take a variety of forms. In one embodiment, the current content displayed is dimmed or otherwise de-highlighted. Animations or video that are playing are illustratively halted. Similarly, any audio from the application would be stopped. It should be noted that in accordance with illustrative embodiments of the present invention, step 530 is optional and updates may continue while the resizing notification is displayed.

Figure 7:
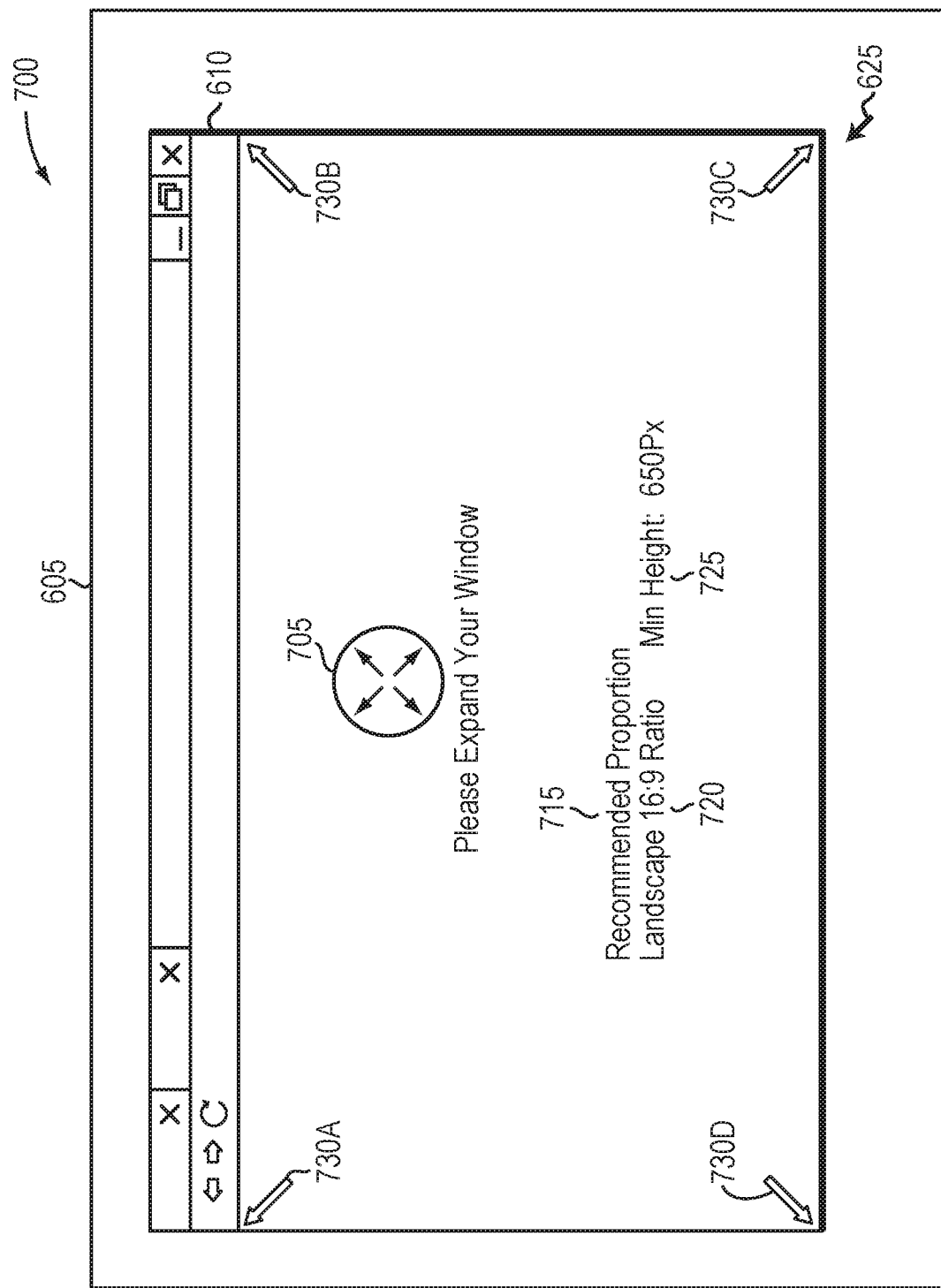
FIG. 7 is a view of an exemplary GUI window illustrating exemplary resizing notifications in accordance with an illustrative embodiment of the present invention.

Then, in step 535, the application displays a resizing notification. Illustratively, the resizing notification may comprise of a variety of alerts. FIG. 7 is a diagram of an exemplary computer screen 600 illustrating exemplary resizing notifications in accordance with an illustrative embodiment of the present invention. Illustrative resizing notifications may include, e.g., center notification 705, text notifications 715, 720, 725, and/or corner arrows 730A-D, The center notification may comprise of a graphic and/or text that is substantially centered in the window to alert the user to take appropriate action. In the example shown in FIG. 7, the center notification comprises of a graphic to alert the user to enlarge the window as well as a text alert. The example shown is to "Please Expand Your Window", which would be displayed if the current window size is smaller than the desired window size. Exemplary alternative text alerts may comprise "Please Change The Aspect Ratio of Your Window", etc. As will be appreciated by those skilled in the art, the text alert may include any suitable text (in any language) that alerts the user to make the desired resizing of the window. The exemplary graphic 705 is indicating that the window should be enlarged in both the X and Y coordinates. In alternative embodiments, the graphic 705 may indicate that the window should be resized in only one direction, e.g., it should be widened. Therefore, the depiction of a center notification 705 that indicates that the window should be enlarged should be taken as exemplary only.

Exemplary text notifications 715, 720, and 725 may be used to indicate the desired display characteristics to the user. For example, a "Recommended Proportion" 715 indicator may identify the desired window proportion, such as exemplary "Landscape 16:9 Ratio" 720. Similarly, a "Min. Height" indicator 725 may inform the user of the minimum height of the window. As will be appreciated by those skilled in the art, the exemplary indicators shown and described herein 715, 720, 725 are exemplary only. Depending on the desired display characteristics, the text indicators may vary based on design choices.

The corner arrows 730A-D may be utilized to indicate in which directions the window is to be enlarged. In alternative embodiments, corner arrows 730 may be located along the edges (not shown) if, for example, a window needs to have its width adjusted, but the height is acceptable. Arrows 730 may be animated, or otherwise designed to draw attention from the user as to the desired action to be taken to resize the window.

Various resizing notifications have been described herein. It should be noted that in various embodiments of the present invention, the resizing notification(s) that maybe utilized may vary and, in alternative embodiments, may include other notifications, either visual or audio, that alert the user to resize the window. Therefore, the description of various resizing notifications should be taken as exemplary only.

In response to the display of the resizing notification, the user resizes the window in step 540. Illustratively, the resizing may occur by, for example, a user providing the cursor to the edge or corner of the window 610 and dragging the window to a new size. In alternative embodiments, the user may click on an exemplary icon 630, 635 to cause window to automatically resize to a predefined size. Once the user completes the resizing operation, the procedure branches back to step 515 where the application continues by detecting the new display characteristics of the window.

Figure 8:
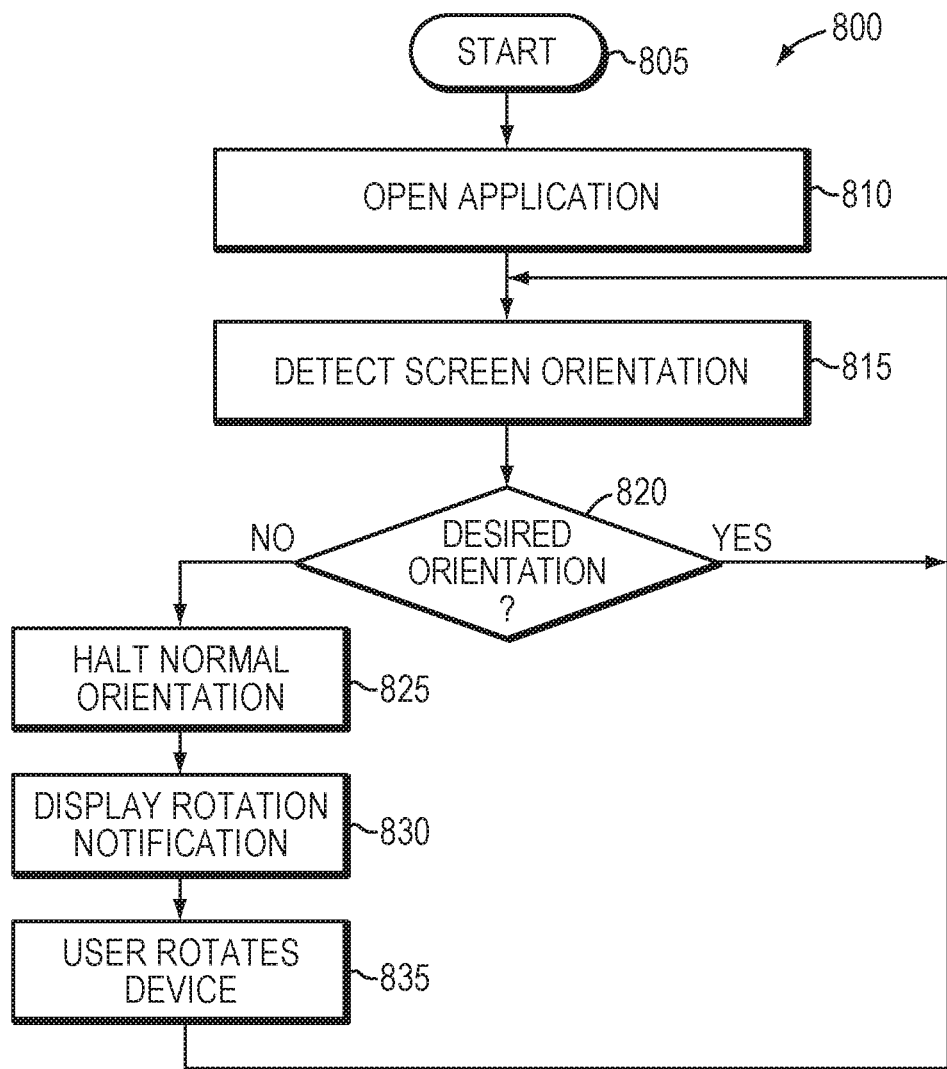
FIG. 8 is a flowchart detailing the steps of a procedure for detecting and correcting a mobile device orientation in accordance with an illustrative embodiment of the present invention.

FIG. 8 is a flowchart detailing the steps of a procedure 800 for changing or alerting a user to a preferred orientation on a mobile device in accordance with an illustrative embodiment of the present invention. Procedure 800 begins in step 805 and continues to step 810 where the application is opened. Illustratively, opening the application may be performed by logging into a particular website using a web browser. In alternative embodiments, the application may be opened by executing the application software by, for example, selecting an icon representative of the application on the mobile device's display. Upon opening the application, the application detects the screen orientation in step 815. As noted above, software code executing within the web browser may utilize function calls to obtain the current orientation of the mobile device. In an embodiment where the application is executing directly on mobile device, such functionality may be implemented by interacting with the operating system of the mobile device. The application then determines whether the detected orientation is the desired orientation in step 820. Illustratively, the application will have a preferred orientation based on the desired way to display content. In step 820, a determination is made whether the orientation that is detected in step 815 matches the desired orientation. If so, the procedure 800 loops back to step 815.

However, if in step 820 it is determined that the orientation is not the desired orientation, the procedure 800 branches to step 825 where the application halts normal operation. Like that described above, the halting of normal operation may comprise a variety of factors or actions. It should be noted that in alternative embodiments, normal operation may not be halted. In such embodiments, a rotation notification (described below in relation to step 830) may be displayed in a manner that does not complete obscure the window. This would allow operation to continue, even though it is not in the optimal orientation. Therefore, it should be noted that the description of the halting of operation should be taken as exemplary only.

Figure 9:
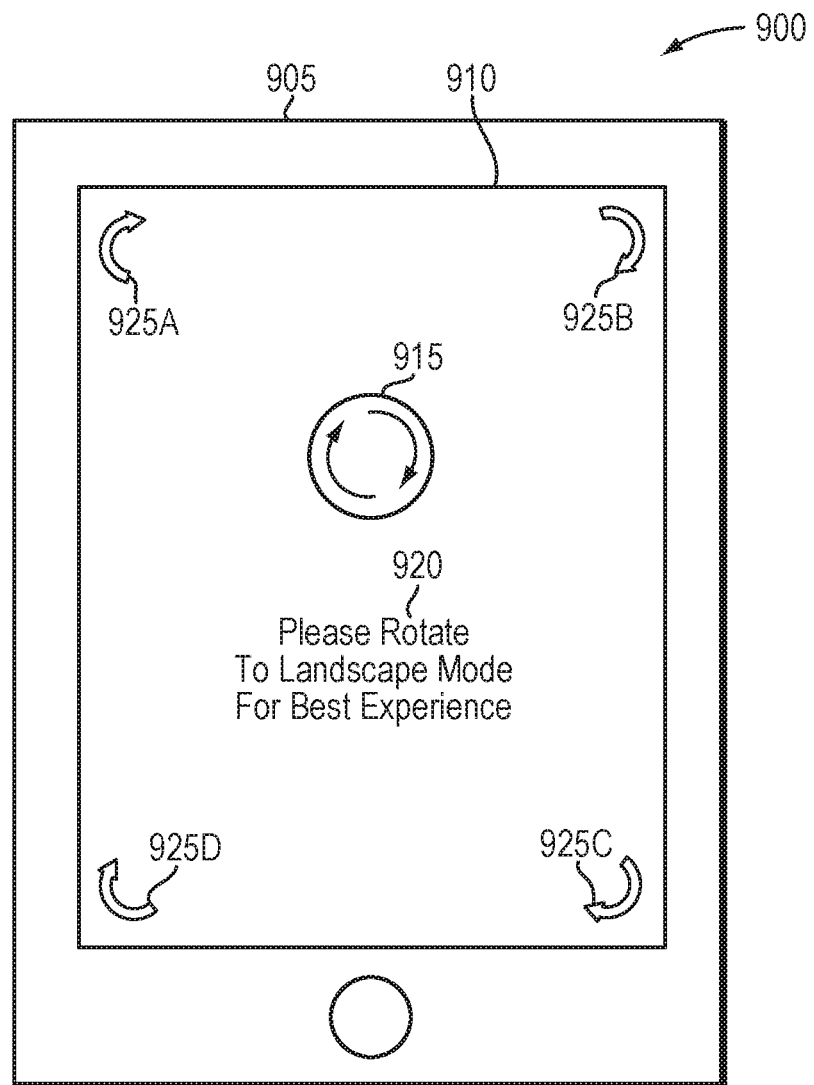
FIG. 9 is a view of an exemplary GUI window illustrating orientation notifications in accordance with an illustrative embodiment of the present invention.

Then, in step 830 a rotation notification is displayed. FIG. 9 is a diagram illustrating a mobile device displaying exemplary rotation notification in accordance with an illustrative embodiment of the present invention. Similar to resizing notification described above, there are a plurality of differing rotation notifications that may be utilized including, e.g., a center notification 915, text notification 920, and/or corner notifications 925A-D. Center notification 915 may comprise of a graphic indicating that the device should be rotated. Text notification 920 may comprise exemplary text that alerts the user that the devise should be rotated. Corner notifications 925A-D similarly alert the user that the devise should be rotated.

As noted above in relation to resizing notifications, the number, type, and format of rotation notifications may vary based on design choices. As such, the description and depiction of rotation notifications contained herein should be taken as exemplary only.

Figure 10:
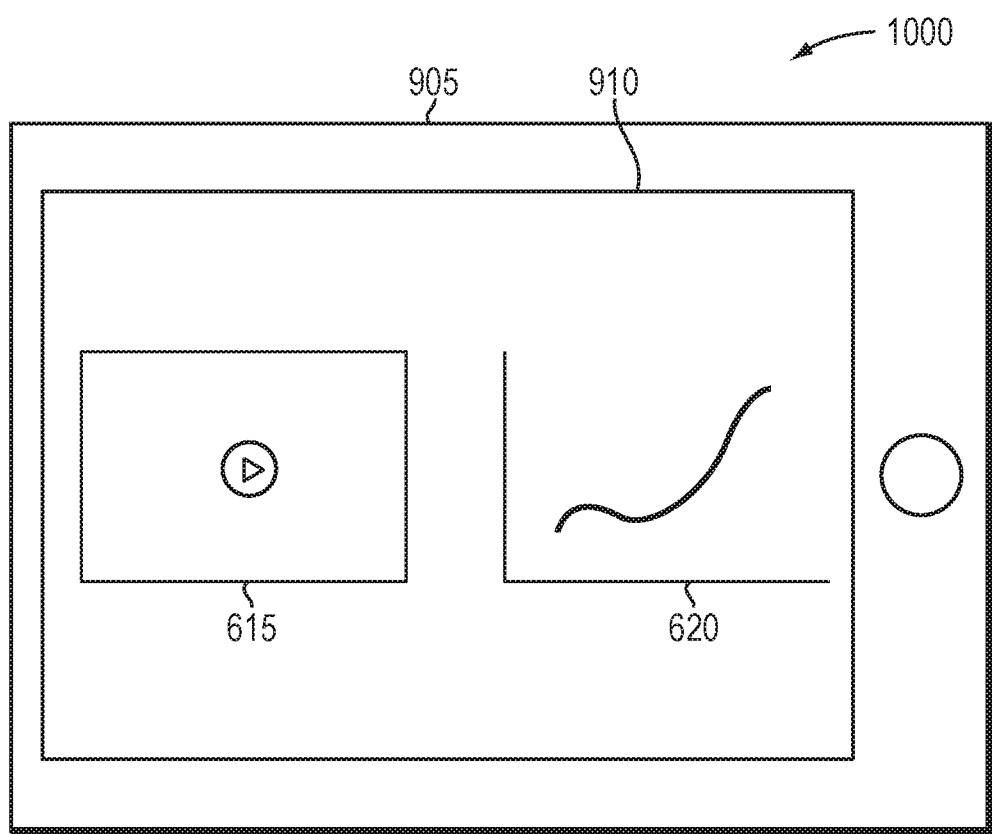
FIG. 10 is a view of an exemplary GUI window illustrating a preferred content view of an application on a mobile device in accordance with an illustrative embodiment of the present invention.

In step 835, a user rotates device to be desired orientation. FIG. 10 is a diagram illustrating an exemplary mobile device after it has been rotated as requested in accordance with an illustrative embodiment of the present invention. In exemplary FIG. 10, the device has been rotated to a landscape orientation and video content 615 and chart 620 are now displayed in the arrangement desired by the application designer.

It should be noted that while the present invention is been written in terms of various illustrative embodiments, the principles of the present invention may be utilized in other manners. Further, while various functionality has been described as being implemented in software, it is expressly contemplated that the functionality may be implement in software, hardware, firmware, or any combination thereof. Therefore, the description of software should be taken as exemplary only.

What is claimed is:

1. A computer implemented method comprising:
    detecting, by an application executing on a processor, a set of display characteristics associated with a graphical user interface (GUI) window associated with the application, wherein the GUI window is displayed on a computer display screen of a computing device;
    comparing the detected display characteristics to a predefined set of display characteristics;
    in response to the detected display characteristics not matching the predefined set of display characteristics, displaying, on the computer display, one or more resizing notifications that indicate to a user that the GUI window needs to be resized, wherein resizing of the GUI window occurs based on user input indicating that the GUI window is to be resized.

2. The computer implemented method of claim 1 wherein the display characteristics include a size of the GUI window.

3. The computer implemented method of claim 1 wherein the display characteristics include an aspect ratio of the GUI window.

4. The computer implemented method of claim 1 wherein the GUI window is a web browser window.

5. The computer implemented method of claim 1 wherein detected the display characteristics is performed using JavaScript.

6. The computer implemented method of claim 1 wherein the one or more resizing notifications includes animated graphics.

7. The computer implemented method of claim 1 wherein the one or more resizing notifications includes a text alert.

8. The computer implemented method of claim 1 wherein the one or more resizing notifications includes one or more indicators of at least one dimension of the GUI window that needs to be increased.

9. The computer implemented method of claim 1 further comprising halting updates to content displayed in the GUI window in response to the detected display characteristics not matching the predefined set of display characteristics.

10. The computer implemented method of claim 9 further comprising in response to a predefined wait time passing, resuming updates of content displayed in the GUI window.

11. The computer implemented method of claim 1 wherein the one or more resizing notifications include arrow graphics.

12. The computer implemented method of claim 11 wherein the arrow graphics identify a dimension of the GUI window that needs to be enlarged.

13. The computer implemented method of claim 1 wherein the one or more resizing notifications include a text display.

14. The computer implemented method of claim 1 wherein the one or more resizing notifications include an animation.

15. The computer implemented method of claim 1 wherein the one or more resizing notifications include a sound alert.

16. The computer implemented method of claim 1 wherein the display characteristics include an orientation of a device displaying the GUI window.

17. The computer implemented method of claim 16 wherein the one or more resizing notifications include an alert to rotate the device from a first orientation to a second orientation.

\* \* \* \* \*